US010153996B2

(12) United States Patent
Tevosyan

(10) Patent No.: US 10,153,996 B2
(45) Date of Patent: Dec. 11, 2018

(54) THREADED CONVERSATION USER INTERFACE

(71) Applicant: Facebook, Inc., Menlo Park, CA (US)

(72) Inventor: Ashoat Tevosyan, New York, NY (US)

(73) Assignee: FACEBOOK, INC., Menlo Park, CA (US)

(*) Notice: Subject to any disclaimer, the term of this patent is extended or adjusted under 35 U.S.C. 154(b) by 346 days.

(21) Appl. No.: 14/581,909

(22) Filed: Dec. 23, 2014

(65) Prior Publication Data

US 2016/0182423 A1 Jun. 23, 2016

(51) Int. Cl.
G06F 3/0485 (2013.01)
G06F 17/22 (2006.01)
G06F 3/0354 (2013.01)
H04L 12/58 (2006.01)
G06F 3/0482 (2013.01)
G06F 3/0488 (2013.01)

(52) U.S. Cl.
CPC ............ H04L 51/16 (2013.01); G06F 3/0482 (2013.01); G06F 3/0485 (2013.01); G06F 3/04883 (2013.01)

(58) Field of Classification Search
None
See application file for complete search history.

(56) References Cited

U.S. PATENT DOCUMENTS

| 8,332,477 B1* | 12/2012 | Kaiserlian | H04L 51/16 715/758 |
| 2006/0242603 A1* | 10/2006 | Wong | G06F 3/0485 715/853 |
| 2010/0103124 A1* | 4/2010 | Kruzeniski | G06F 3/0482 715/863 |
| 2012/0088548 A1* | 4/2012 | Yun | G08C 17/02 455/557 |
| 2012/0174005 A1* | 7/2012 | Deutsch | G06F 3/04817 715/764 |
| 2013/0111396 A1* | 5/2013 | Brid | G06F 3/0485 715/784 |

* cited by examiner

Primary Examiner — Jeffrey A Gaffin
Assistant Examiner — Nhat Huy T Nguyen
(74) Attorney, Agent, or Firm — Keller Jolley Preece

(57) ABSTRACT

Embodiments described herein provide a Threaded Conversation User Interface ("TCUI") on a display area of a computer used to connect a social network. The TCUI comprises a plurality of nested columns. First, second, and third nested columns of the plurality of nested columns includes first, second, and third comments, respectively. The first nested column is positioned at a left margin of the display area, the second nested column is indented a single indentation width from the display area's left margin, and the third nested column is indented multiple indentation widths from the display area's left margin. A type of input gesture is determined from a received input gesture and in response, the TCUI is scrolled. The scrolling is terminated with at least one of second, third, or another nested column positioned at the left edge of the display area, the termination being based at least on the determined input gesture.

20 Claims, 13 Drawing Sheets

THREADED CONVERSATION USER INTERFACE

FIELD

Embodiments described herein relate to graphical user interfaces. Specifically, the embodiments relate to a user interface for presenting a threaded conversation and scrolling between portions of the threaded conversation.

BACKGROUND

Conversation threading refers to grouping messages in a hierarchy, with any replies to a message arranged visually near the original message. For example, each reply to a message or another reply may appear below the message or the other reply at an indented position. A plurality of messages grouped in this way is commonly known as a "topic thread" or a "thread." In social networks, conversation threading is commonly known as "nested conversations" or "nested comments." A nested conversation allows a user to understand how each comment relates to the other comments. The size of electronic visual displays of currently-available computers, however, can make viewing nested comments difficult.

SUMMARY OF THE DESCRIPTION

Exemplary methods, apparatuses, and systems provide a Threaded Conversation User Interface (TCUI) on a display area of a computer. The TCUI comprises a plurality of nested columns. For example, first, second, and third nested columns of the plurality of nested columns include first, second, and third comments, respectively. The first nested column is positioned at a left margin of the display area, the second nested column is indented a single indentation width from the display area's left margin, and the third nested column is indented multiple indentation widths from the display area's left margin. The computer, however, may not display all of the content of the nested columns as a result of the indented positions of the various columns. In response to receiving an input gesture and determining the type of the input gesture, the computer scrolls the TCUI. The scrolling is automatically terminated with at least one of the second, the third, or another nested column positioned at the left margin of the display area, based at least on the determined input gesture type.

Other features and advantages are apparent from the accompanying drawings and detailed description.

BRIEF DESCRIPTION OF THE DRAWINGS

The present invention is illustrated using non-limiting examples in the figures of the accompanying drawings, in which like references indicate similar elements.

DETAILED DESCRIPTION

Users of a social networking system share content by posting electronic messages to the system, e.g., a user creates a post having content that includes textual, audio, and/or visual media describing the user's state of mind, plans, etc. The users can also interact with each other by commenting on each other's posts. Conversation threading enables a logical presentation of users' posts and comments on electronic visual displays of users' computers. Visually presenting a threaded conversation, however, can be inconvenient when a user views, comments, and/or composes a post using a computer having a small electronic visual display, e.g., the display of a smartphone. Accordingly, embodiments described herein enable viewing a threaded conversation of a social networking system on an electronic visual display of any size using a Threaded Conversation User Interface (TCUI) to control scrolling between threaded content. Thus, users of the social networking system can engage in threaded conversations without being limited by sizes of electronic visual displays.

In the following description, numerous specific details are set forth. However, it is understood that embodiments of the invention may be practiced without these specific details. While a social networking system is used to describe embodiments of the TCUI, it will be understood that these concepts are generally applicable to other network services, websites, etc. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Additionally, as used herein, the term "exemplary" and its variations refer to embodiments that serve simply as an example or illustration. Furthermore, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
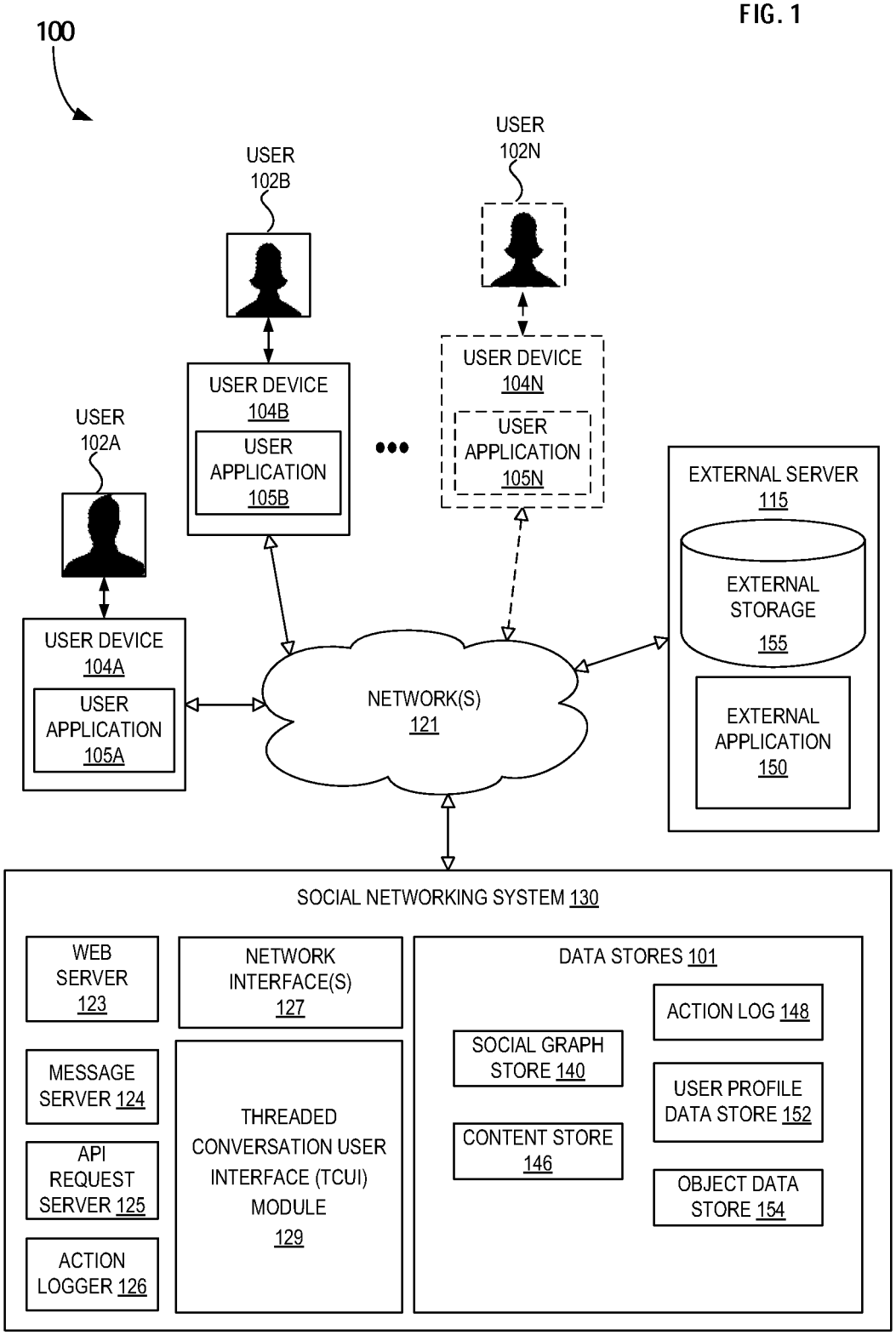
FIG. 1 illustrates a network environment of a system including a social networking system.

FIG. 1 illustrates an exemplary network environment of a system 100 including a social networking system 130 that offers users 102A-102N the ability to communicate and interact with other users 102A-102N and entities of the social networking system 130 according to an embodiment. The illustrated social networking system 130 includes a TCUI module 129 for providing a TCUI to present and control the scrolling of a threaded conversation.

The user devices 104A-104N can interact with social networking system 130 and can be any type of computer capable of receiving user input as well as transmitting and/or receiving data via a network (e.g., network(s) 121). Exemplary user devices 104A-104N include conventional computer systems, such as a desktop or laptop computer, or may include devices having computer functionalities such as Personal Digital Assistants (PDA), cellular or mobile telephones, smartphones, in- or out-of-car navigation systems, gaming devices, or other electronic devices.

In one embodiment, a user device (e.g. 104A) may execute a user application (e.g. 105A) allowing a user 102A of the user device 104A to interact with the social networking system 130. For example, the user application 105A may be a web browser application. In an embodiment, the user application 105A is a client application (e.g., Facebook for iPhone or iPad, etc.), and in an embodiment the user application 105A is the native operating system of the user device 104A, such as Windows®, Mac OSX®, iOS®, or ANDROID™, which may utilize an Application Programming Interface (API) to directly interface with the social networking system 130 through API request server 125. In one embodiment, user application 105A provides a TCUI to present and control the scrolling of a threaded conversation as described in further detail herein.

The user devices 104A-104N can communicate with the social networking system 130 via a network 121 or collection of networks, such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols.

In one embodiment, the social networking system 130 comprises one or more computing systems storing user profiles associated with users 102A-102N and/or other objects, as well as connections between users and other users 102A-102N and/or objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, an album, an article, a book, a movie, food, etc.

Based on the stored data about users, objects, and the connections between the users and/or objects, the social networking system 130 generates and maintains a social graph in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions. An exemplary social graph is described with reference to FIG. 2.

To provide these functionalities, one embodiment of the social networking system 130 includes a web server 123, a message server 124, an API request server 125, an action logger 126, and a set of data stores 101. This embodiment also includes, within the data stores 101, a social graph store 140, a content store 146, an action log 148, a user profile data store 152, and an object data store 154. In one embodiment, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users 102A-102N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, hobbies, location, other preferences, and the like. The user profile may also store information provided by the user. For example, images, videos, and location data provided by the user may also be stored within the user profile. In one embodiment, only textual data of the user is stored in the user profile and other data (e.g., images, videos, etc.) are stored in multimedia stores and associated with the user (e.g., through associating a user identifier of the user with an image/video identifier of the multimedia content). In one embodiment, images, videos, and posts by users including or depicting one or more other users of the social networking system 130 may be "tagged" with identification information of those users. A user profile in the user profile data store 152 may also maintain references to actions (stored in the user profile or in an action log 148) by the corresponding user performed on content items in a content store 146. A user may also specify one or more privacy settings, which are stored in that user's user profile. Privacy settings limit information that the social networking system 130 or other users of the social networking system 130 are permitted to access from that user's user profile.

The web server 123 links the social networking system 130 via the network 121 to one or more user devices 104A-104N by accepting requests from the user devices 104A-104N and/or transmitting webpages or other web-related content to the user devices 104A-104N, such as image files, audio files, video files, Java applets, Flash, XML, JavaScript, Cascading Style Sheets (CSS), and so forth. The web server 123 in one embodiment is configured to utilize a set of one or more network interfaces 127 to send and receive messages across the network 121. In one embodiment the web server 123 (additionally or alternately) utilizes a message server 124 (e.g., a dedicated server end station, a dedicated software application, etc.) to communicate with the user devices 104A-104N, which is operative to send and/or receive instant messages, queued messages (e.g., email), text and SMS (Short Message Service) messages, or utilize any other suitable messaging technique.

In one embodiment, the social networking system 130 sends a message composed by a user to another user, which can be viewed by other users of the social networking system 130, e.g., by certain connections of the user (directly connected users in the social graph, other users more than one hop away in the social graph, etc.) receiving the message. An example of a type of message that can be viewed by other users of the social networking system 130 (besides the recipient of the message) is commonly known as a post. In one embodiment, users of the social networking system, including the user that created a post, can provide comments and/or replies to the post, as described in further detail in FIG. 2. In these embodiments, the comments and/or replies can be in the form of electronic messages that include audio, visual, and/or haptic media. In one embodiment, a user can send a private message to another user that can only be retrieved by the other user. For example, these messages may be stored in data stores 101.

When a user takes an action within the social networking system 130, an action logger 126, subject to any privacy settings and restrictions of the user and/or social networking system 130, may record the action in an action log 148. In one embodiment, the social networking system 130 maintains the action log 148 as a database of entries. When an action is taken on the social networking system 130, the social networking system 130 can add an entry for that action to the action log 148. According to one embodiment, the action logger 126 can receive communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another user, sending a message to the other user, reading a message from the other user, viewing content (e.g., posts, images, videos) associated with or created by the other user, attending an event posted by another user, being tagged in posts or photos with/by another user, etc. In one embodiment, certain actions are described in connection with more than one user, and these actions may be associated with those users as well and stored in the action log 148.

Users 102A-102N may interact with various objects on the social networking system 130, including commenting on posts via user devices 104A-104N, sharing content via user devices 104A-104N, accessing content items in a sequence via user devices 104A-104N, or other interactions. Information describing these actions is stored in the action log 148. Additional examples of interactions with objects on the social networking system 130 included in the action log 148 include logging in to the social networking system 130 using user devices 104A-104N, "checking-in" to a "location" on the social networking system 130 using user devices 104A-104N, commenting on a photo album via user devices 104A-104N, communications between users' user devices 104A-104N, becoming a fan of a musician or brand by "liking" a page of the respective entity using user devices 104A-104N, adding an event to a calendar using user devices 104A-104N, joining a group using user devices 104A-104N, creating an event using user devices 104A-104N, authorizing an application using user devices 104A-104N, using an application using user devices 104A-104N, and engaging in a transaction using user devices 104A-104N. Additionally, the action log 148 records a user's interactions with advertisements on the social networking system 130 as well as other applications operating on the social networking system 130. In one embodiment, data from the action log 148 is used to infer interests or preferences of the user, augmenting the interests included in the user profile and allowing a more complete understanding of user preferences.

The action log 148 may be used by the social networking system 130 to track other user actions on the social networking system 130, as well as actions on an external application 150 (e.g., website) that are communicated to the social networking system 130. For example, the social networking system 130 may allow users to interact with external (e.g., third-party) applications 150 (e.g., websites), external storage 155, and/or external servers 115 (e.g., server end stations). The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a system (e.g. external application 150) may send an API request to the social networking system 130 via the network 121 to publish a story on behalf of a user, request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting these responses back to the requesting application 150 via the network 121.

The content store 146 stores content items associated with user profiles, such as images, videos, and/or audio files. Content items from the content store 146 may be displayed when a user profile is viewed or when other content associated with the user profile is viewed. For example, displayed content items may show images or video associated with a user profile or show text describing a user's status, commonly known as a status update. Additionally, other content items may facilitate user engagement by encouraging a user to expand his connections to other users or entities, to invite new users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status updates, messages, or links posted by users to the social networking system, events, groups, pages (e.g., representing an organization or commercial entity), and any other content provided by, or accessible via, the social networking system 130.

The content store 146 also includes one or more pages associated with entities included in social graph store 140. An entity is a type of object that can be a non-individual user of the social networking system 130, such as a business, a vendor, an organization, or a university. However, in one embodiment, an entity may represent a celebrity or other well-known individual, and thus an entity object node for a person may exist in the social graph (serving as a brand for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) as well as information describing how to present the content to users viewing the page.

In the depicted embodiment, the social networking system 130 includes a TCUI module 129. The TCUI module 129 performs or causes a user device to perform one or more functions for presenting and controlling the scrolling of a threaded conversation as described in further detail herein. While embodiments described herein may refer to method(s) of presenting a threaded conversation on a TCUI performed by the TCUI module 129, all or part of the method(s) (e.g., method 300) may be spread across multiple components or may be performed by an external application 150 running on an external server 115 or user application 105 running on user device 104.

Figure 2:
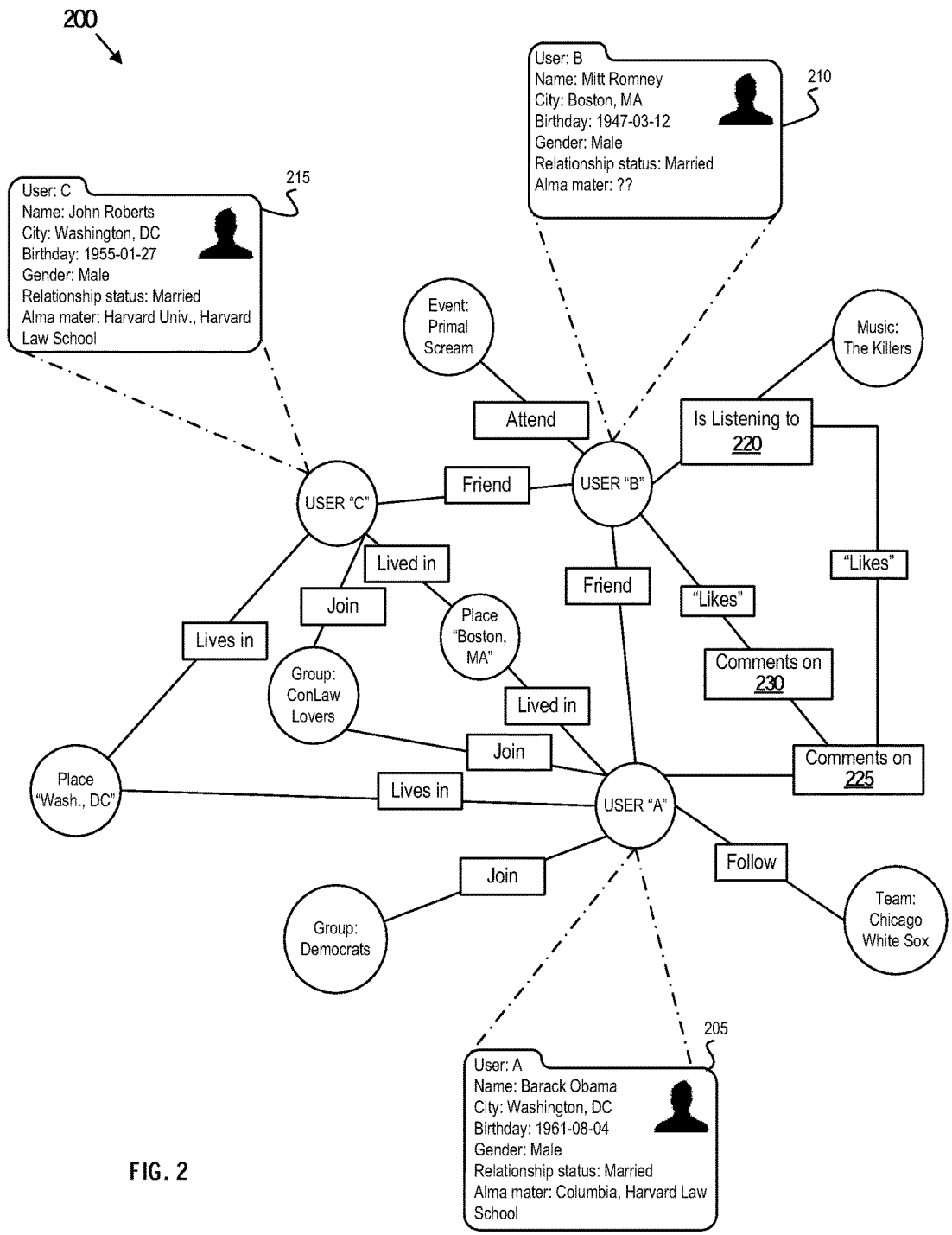
FIG. 2 illustrates a graph of social network data.

FIG. 2 illustrates an exemplary graph 200 of social network data. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that User A previously lived in Boston, currently lives in Washington D.C., joined groups for Democrats and ConLaw Lovers, checked in at Pi Pizzeria in St. Louis, Mo., and is friends with User B. User B and User C have also performed a number of actions with respect to objects within graph 200.

In one embodiment, users, such as Users A-C, are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than when two users are friends. Additionally, temporal and geographic proximity of actions/users are other exemplary indicators of affinity.

In one embodiment, users are able to provide feedback on actions of other users/entities. As a result, actions are also objects that may be acted upon. For example, User B listened to music by the artist, The Killers. Consequently, the social networking system can publish a narrative associated with User B (e.g., in a newsfeed, profile of User B, etc.) indicating that User B listened to The Killers. In viewing a newsfeed, profile of User B, or another form of social networking system publication(s), the social networking system can display the narrative as a post 220 to Users A, User B, and/or User C. In one embodiment, the post 220 includes, without limitation, a string of text representing information to be shared with other users, e.g., a status update or a message. The social networking system then receives input from User A indicating that User A "likes" that User B listened to The Killers. In one embodiment, the social networking system receives input from User A for creating and displaying a post 225 as a reply to the post 220 associated with User B. For an example illustrating a threaded conversation, the post 225 associated with User A is published and indented underneath the post 220 associated with User B.

In one embodiment, additional posts replying to the post 220 associated with User B and/or the post 225 associated with User A can be created by User A, User B, and/or other users of the social networking system, e.g., User C. For example, the social networking system receives input from User B for creating and publishing a post 230 as a reply to the post 225 associated with User A. In this example, which illustrates an expanding threaded conversation, the post 230 associated with User B is published and indented underneath the post 225 associated with User A.

In one embodiment, users may select privacy settings to control what network service data is shared, with whom the data is shared, and/or what data is used for selecting candidate objects. For example, the privacy settings of User B and/or User A can prevent User C from commenting on posts created by User B and/or User A.

Figure 3:
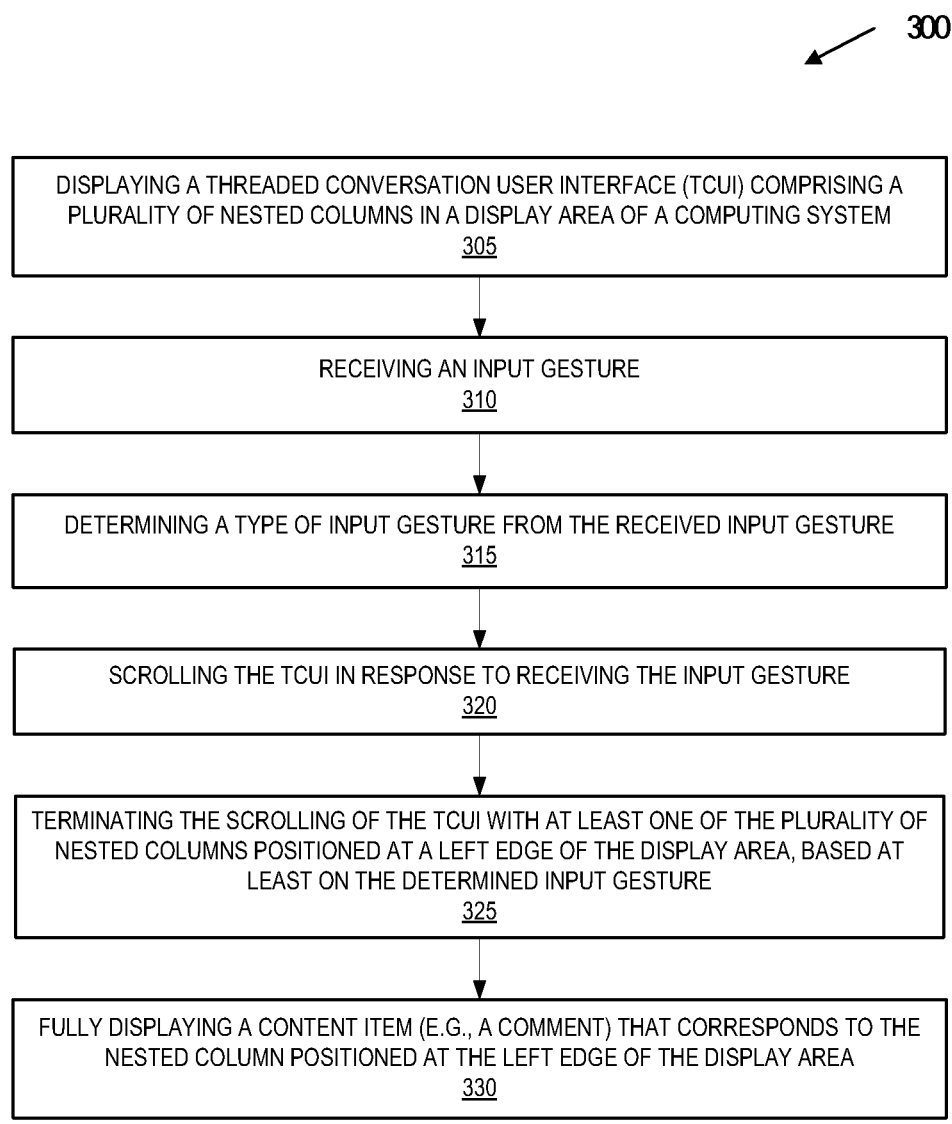
FIG. 3 illustrates, in flow chart form, a process for presenting a conversation within a Threaded Conversation User Interface (TCUI) and controlling the scrolling of the TCUI in response to one or more input gestures.

FIG. 3 illustrates, in flow chart form, method 300 for presenting and controlling the scrolling of a threaded conversation. Method 300 is described with reference to a user device. Method 300, however, may also be performed by or in conjunction with a social networking system, an external server, or another computer.

At block 305, the user device presents/displays a TCUI on the display area of the user device. For example, social networking system 130 or external server 150 transmits TCUI data (including content, formatting instructions, one or more client scripts, etc.) to user device 104A causing the TCUI to be displayed on user device 104A. In one embodiment, the TCUI comprises a plurality of nested columns for displaying or presenting content items, such as posts of a threaded conversation. Posts of a threaded conversation can be received by the social networking system from user inputs or they can be generated based on data acquired by or stored in the social networking system, e.g., message server 124, action logger 126, or another module described above in FIG. 1.

In one embodiment, the social networking system obtains information from the computer for conforming the TCUI to the display area of a user device. For example, social networking system 130 obtains information from user devices 104A-104N about the user applications 105A-N and/or sizes of the user devices' display areas and uses that information to instruct the user device to conform the TCUI to the user devices' display areas. In one embodiment, this user device information is stored in the social networking system. Alternatively, social networking system 130 transmits TCUI data, including content and formatting instructions, to user device 104A and user device 104A utilizes the formatting instructions to conform the content to the size of the display of user device 104A. For example, user devices 104 having different size displays may both receive formatting indicating an indentation within the TCUI, but each user device 104 may use a different indentation width to implement the indentation.

In an embodiment, the social networking system instructs the user device to position each of the plurality of nested columns at a location in the TCUI that corresponds to an indentation within the display area. FIGS. 4A-7B, described below, provide additional details about positioning nested columns.

At block 310, the user device receives an input gesture from an input device. For example, user device 104A receives an input gesture on a touchscreen of user device 104A. A touchscreen, as used herein, is an electronic visual display of a computer for receiving inputs through simple and/or multi-touch input gestures using a stylus, a pen, and/or one or more fingers. For the sake of brevity, the description provided herein refers to a touchscreen as the input device even though other input devices, as known in the art, may be used.

At block 315, the user device determines a type of input gesture from the received input gesture. In one embodiment, the user determines the input gesture type based on input gesture data. In one embodiment, the input gesture data includes, without limitation, data about at least one of: a point of initial contact with the touchscreen; a point of final contact with the touchscreen; a distance between the point of initial contact and the point of final contact; a speed of a movement from the point of initial contact to the point of final contact across the touchscreen; and/or a time of completion of the movement from the point of initial contact to the point of final contact across the touchscreen. Alternatively, the user device transmits the received input gesture data to the social networking system to interpret the gesture type.

Figure 4A:
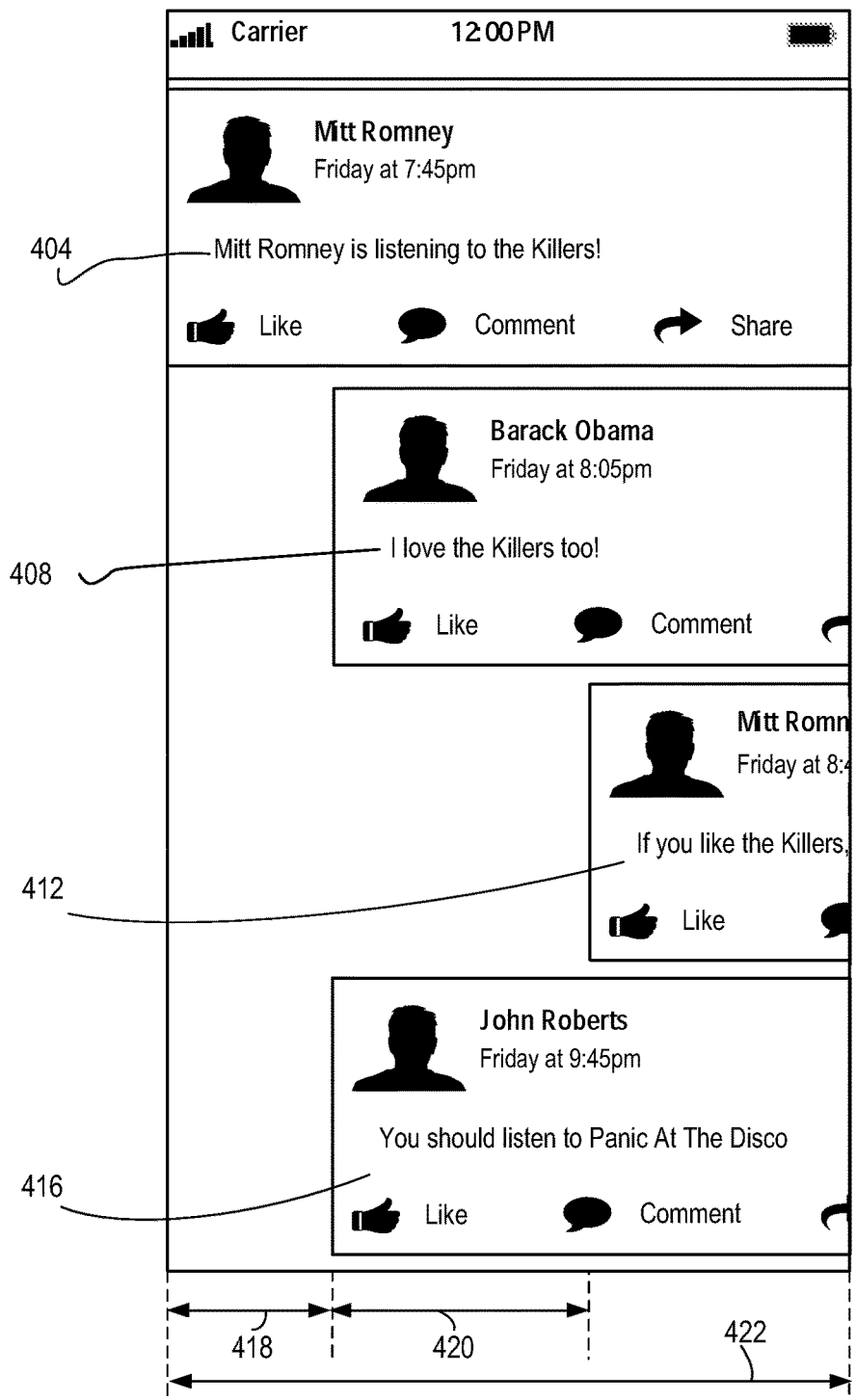
FIGS. 4A-4C illustrate a manner of scrolling an exemplary TCUI in response to each of a quick swipe input and a sustained swipe input.
Figure 4B:
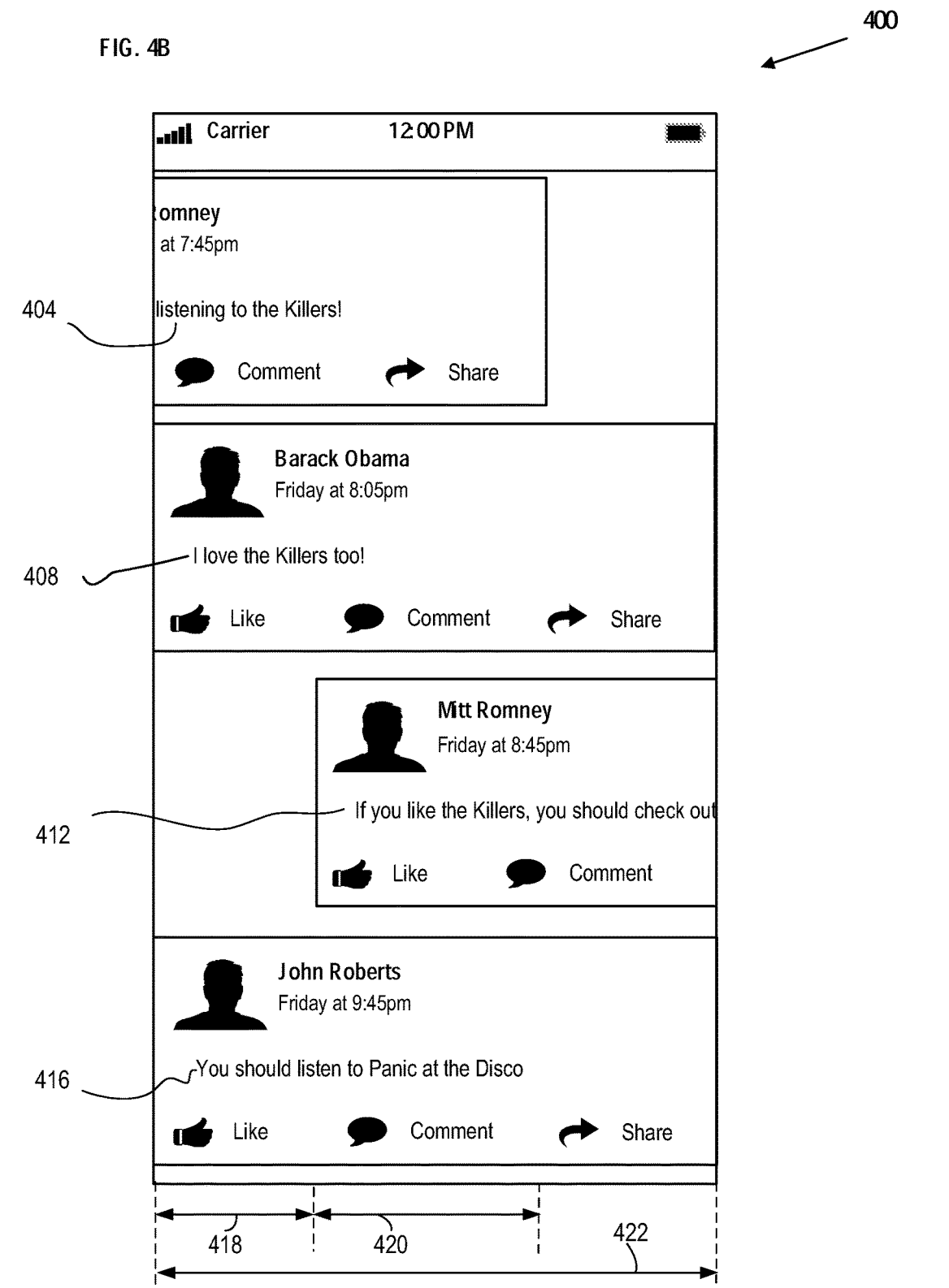

In one embodiment, the determined input gesture is at least one of a quick swipe, a sustained swipe, a selection of a visual placeholder holder, or a selection of column indicator. As used herein, a quick swipe and its variations refer to an input gesture comprising quickly swiping the display area in a horizontal direction with a stylus, a pen, and/or one or more fingers. For example, a quick swipe may refer to a swiping in a horizontal direction for less than a threshold amount of time and/or less than a threshold horizontal distance. FIGS. 4A and 4B, described below, provide additional detail about a quick swipe.

Figure 4C:
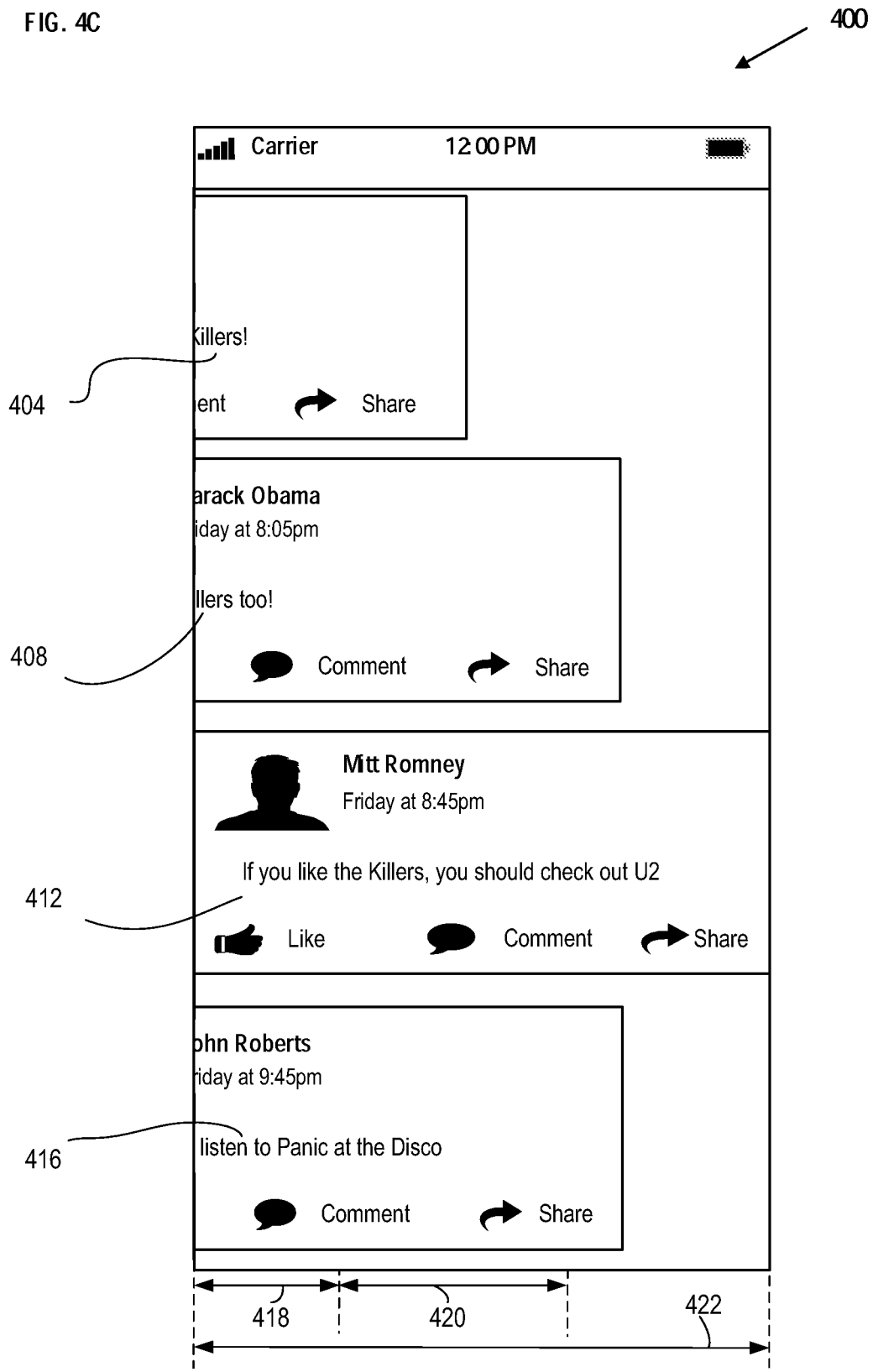

As used herein, a sustained swipe and its variations refer to an input gesture comprising putting the stylus, the pen, and/or the one or more fingers on a particular location of the display area and keeping the stylus, the pen, and/or the one or more fingers in contact with the display area as the stylus, the pen, and/or the one or more fingers moves in a horizontal direction to another location of the display area, e.g., for more than a threshold amount of time and/or more than a threshold horizontal distance. FIGS. 4A and 4C, described below, provide additional detail about a sustained swipe.

Figure 6A:
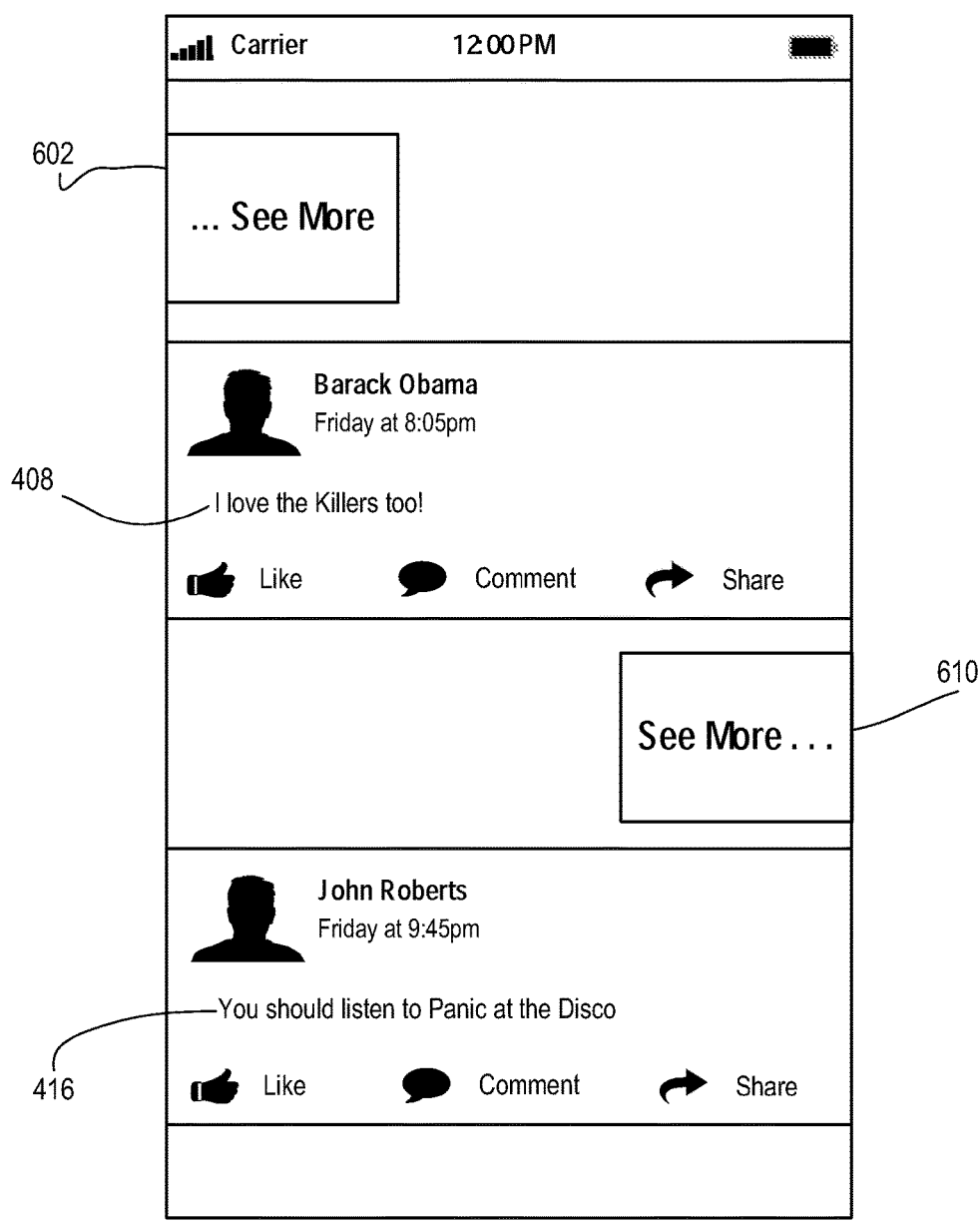
FIGS. 6A-6B illustrate, in an exemplary TCUI, a manner of presenting a threaded conversation in response to a selection of a visual placeholder.
Figure 6B:
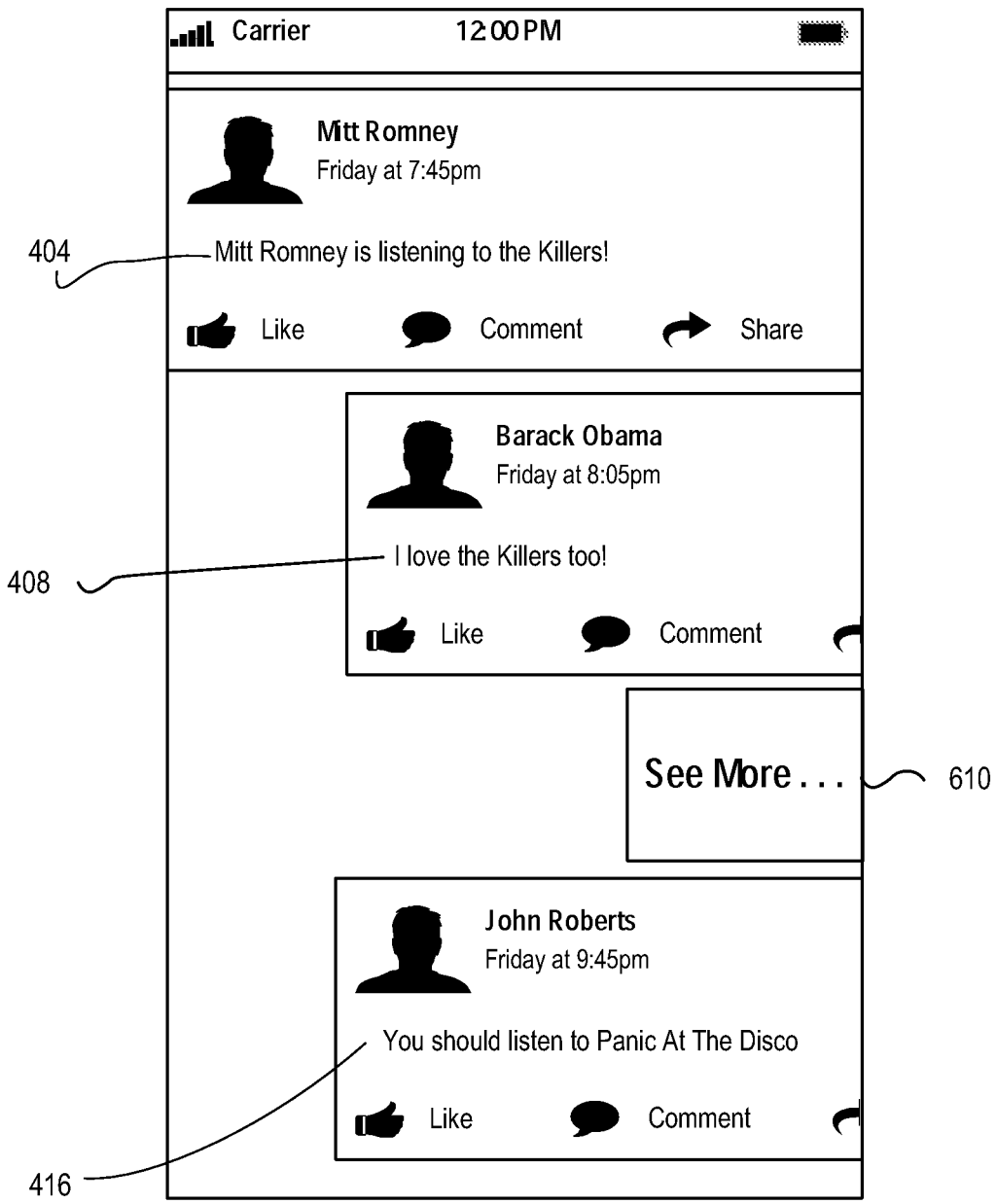

As used herein, a visual placeholder and its variations refer to a selectable graphical object indicating nested column(s) and/or content item(s) that are not being displayed in the display area. The selectable graphical object can be visually perceivable on the TCUI (e.g., a displayed icon or indicator), or the selectable graphical object can be a blank space. In one embodiment, selecting the visual placeholder includes tapping the visual placeholder with the stylus, the pen, and/or the one or more fingers. FIGS. 6A and 6B, described below, provide additional detail about a visual placeholder.

Figure 7A:
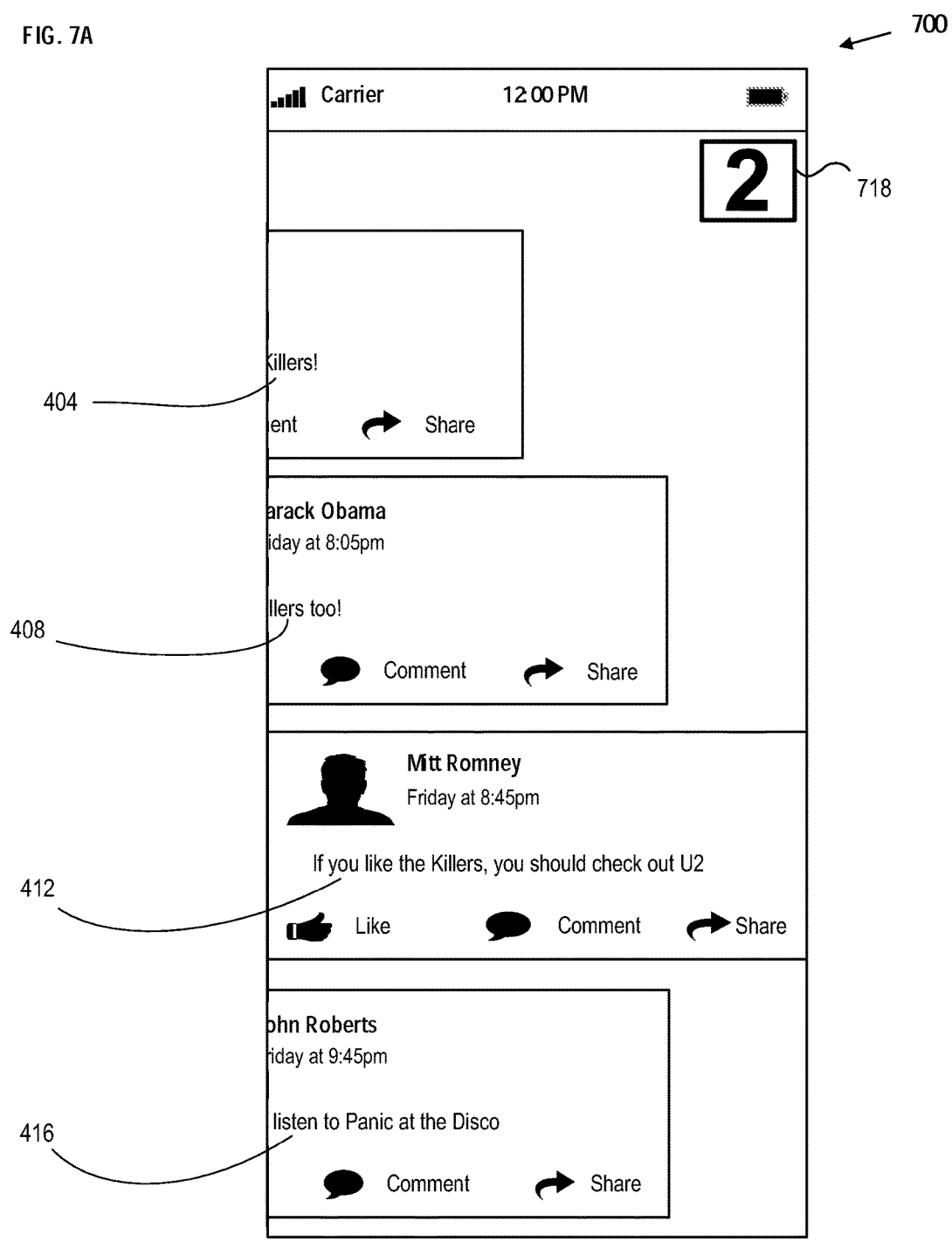
FIGS. 7A-7B illustrate, in an exemplary TCUI, a manner of presenting a threaded conversation in response to a selection of a column indicator.
Figure 7B:
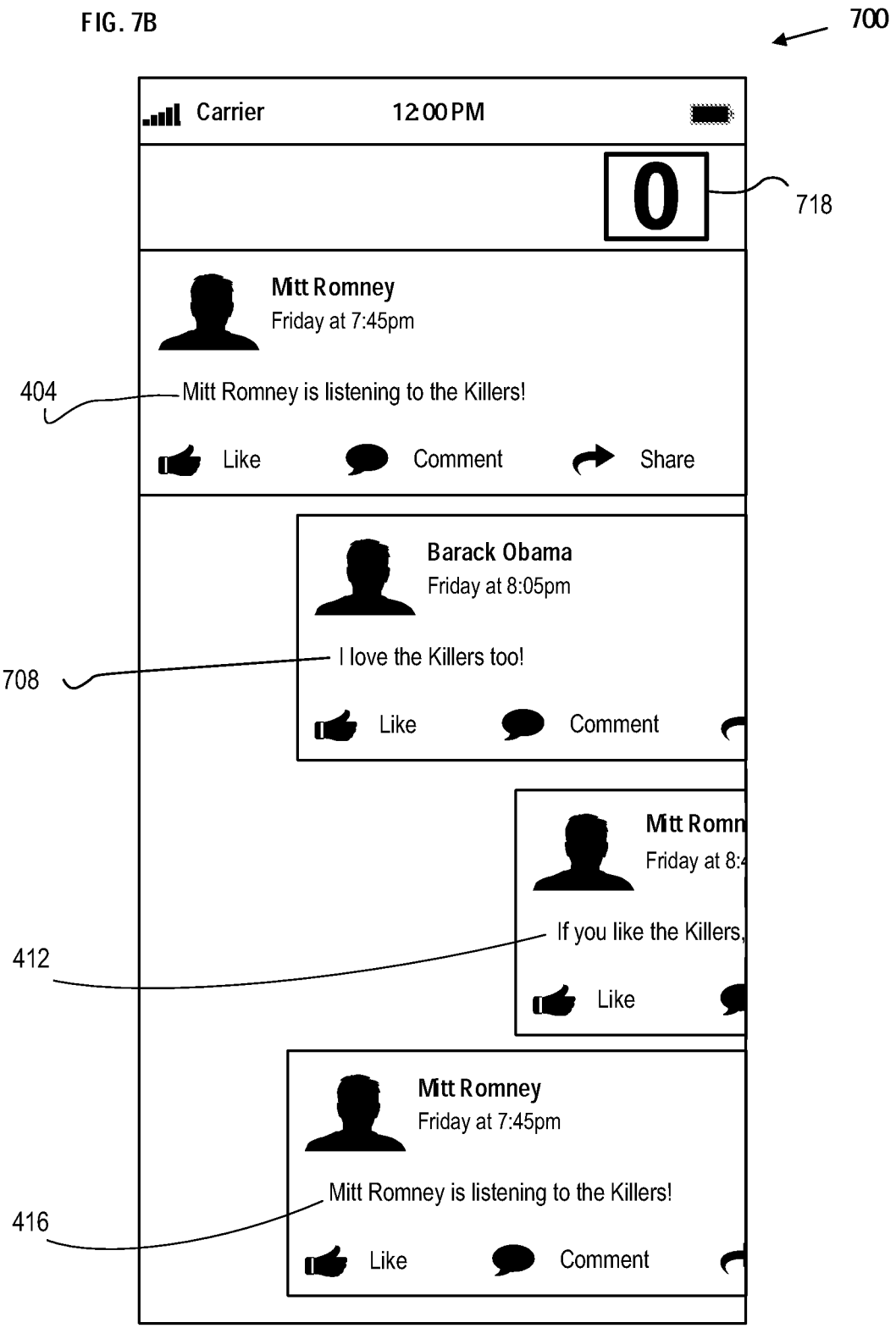

As used herein, a column indicator and its variations refer to a selectable graphical object indicating a number of nested columns and/or content items to the left of a display area's left margin. In one embodiment, selecting the column indicator includes tapping the column indicator with the stylus, the pen, and/or the one or more fingers. FIGS. 7A and 7B, described below, provide additional detail about a column indicator.

At block 320, the user device scrolls the TCUI in at least one of a horizontal or a vertical direction in response to the received input gesture. The direction that the social network system scrolls the TCUI is dependent upon the determined input gesture type and the direction of the input gesture. For example, client device 104A executes user application 105A and/or a client-side script provided by social networking system 130 or external server 115. Using instructions contained in application 105A or the client-side script, user device 104A initiates the scrolling of the TCUI in the corresponding direction.

At block 325, the user device terminates the scrolling of the TCUI based upon the received input gesture. For example, using instructions contained in application 105A or the client-side script, user device 104A terminates the scrolling of the TCUI based upon the length of contact, gesture speed, alignment of content with a margin of the display area, etc. In one embodiment, the termination is based at least on the determined input gesture type. For example, the social networking system terminates the scrolling of the TCUI based on whether the received input is a quick swipe, a sustained swipe, a selection of a visual placeholder, or a selection of a column indicator. FIGS. 4A-7B, described below, provide additional details about termination of scrolling based on determined input gestures. In one embodiment, the user device terminates the scrolling of the TCUI such that a different column is positioned at the left margin of the display area than the column that was positioned at the left margin of the display area prior to receiving the input gesture.

At block 330, the user device fully displays the content item(s) (e.g., a post of a threaded conversation) corresponding to the nested column positioned at the left margin of the display area. For example, content in the nested column positioned at the left margin of the display area may have previously been only partially displayed or not displayed at all.

Referring now to FIGS. 4A-4C, which illustrate, in an exemplary TCUI 400, a manner of presenting a threaded conversation when each of a quick swipe input and a sustained swipe input are received by the social networking system.

With reference now to FIG. 4A, TCUI 400 includes a plurality of nested columns including posts. Each nested column aligns the left edge of the corresponding posts within that column. In the illustrated embodiment of FIG. 4A, a first nested column includes post 404; a second nested column includes posts 408 and 416; and a third nested column includes post 412. It is to be appreciated that more or less than four nested columns can be used in TCUI 400 and that each nested column can include more than one post, as well as, other types of content.

In one embodiment, a location of a nested column's left edge relative to the left margin of the display area denotes that nested column's position. For example, the first nested column including post 404 is positioned at the left margin of the display area of TCUI 400. In this example, the position of the second nested column including posts 408 and 416 is a single indentation width 418 from the left margin of the display area of TCUI 400. The position of the third nested column including post 412 is an indention width 420 from the left edge of the second column. In one embodiment, indention width 420 is a multiple of indentation width 418. Furthermore, as illustrated, each of indentation widths 418 and 420 is less than the first nested column's width 422. In one embodiment, an indentation width and its variations refer to a width that is smaller than a nested column's width. In one embodiment, the indentation width is determined based upon the size of the user device display area.

In one embodiment, the user device fully displays content items of a nested column positioned at the left margin of a display area. For example, the first nested column including post 404 is positioned at the left margin of the display area of TCUI 400. As a result, the content items within the first nested column (e.g., post 404) are fully displayed in TCUI 400. In this embodiment, the user device may scroll TCUI 400 such that another nested column (e.g., that is at least partially displayed in TCUI 400) is positioned at the left margin of the display area of TCUI 400 in response to the input gestures described herein.

In one embodiment, when the user device receives a quick swipe input gesture (e.g., to the left), the user device scrolls TCUI 400 and terminates the scrolling when the second nested column (including post 408 and 416) is positioned at the left margin of the display area.

FIG. 4B illustrates TCUI 400 after the user device (e.g., displaying TCUI 400 as illustrated in FIG. 4A) receives a quick swipe. In one embodiment, in response to receiving a quick swipe, the user device scrolls TCUI 400 and terminates the scrolling in a manner that positions a nested column at the left margin of the display area. For example, when the user device detects that the touch input is a swipe in a horizontal direction, the user device begins scrolling TCUI 400 in the direction corresponding to the swipe. Upon detecting termination of the swipe (e.g., the finger/stylus/etc. breaking contact with the touchscreen) and that the distance and/or time of the swipe is less than a threshold amount of time and/or a threshold distance, the user device detects that a quick swipe has been received. In response to the received quick swipe, the user device selects a nested column that is nearest, in the direction of the quick swipe, to the column that was aligned with the left margin of the display area prior to receiving the quick swipe. When the selected column is not aligned with the left margin of the display area (e.g., following the initial scrolling), the user device continues scrolling, either in the original scrolling direction or in the opposite direction, until the selected column is aligned with the left margin of the display area. For example, as illustrated in FIG. 4B, the user device positions the second nested column of TCUI 400 (including post 408) at the left margin of the display area of TCUI 400 in response to receiving the quick swipe and determining that the second nested column is the nested column that is nearest to the first nest column (which was previously aligned with the left margin) in the direction of the quick swipe. As a result of the terminating of the scrolling such that the second nested column is aligned with the left margin of the display area, one or more of the content items of the second nested column are fully displayed in TCUI 400. For example, post 408 of the second nested column, which was only partially displayed prior to the quick swipe, is now fully displayed as a result of the quick swipe, corresponding scrolling, corresponding termination of the scrolling, and positioning of the second nested column at the left margin of the display area of TCUI 400.

In one embodiment, the user device terminates the scrolling of TCUI 400 at a distance equivalent to indentation width 418 in response to receiving a quick swipe to move TCUI 400 content to the left. For example, the user device terminates the scrolling such that the second nested column (including posts 408 and 416) of TCUI 400 is positioned at the left margin of the display area in response to the quick swipe. Posts 408 and 416 of the second nested column, which were only partially displayed prior to the quick swipe and corresponding scrolling, are now fully displayed as a result of the quick swipe and corresponding scrolling. In one embodiment, the user device will not terminate quick swipe scrolling at a distance that results in posts 408 and 416 being only partially displayed. In one embodiment, the user device terminates the scrolling of TCUI 400 at a distance equivalent to a multiple of indentation width 418, a distance equivalent to indentation width 420, or another indentation width in response to receiving a quick swipe.

As described above, a quick swipe includes a gesture in which the input includes detectable contact with the touchscreen while swiping in a horizontal direction for less than a threshold amount of time and/or less than a threshold horizontal distance. As long as a gesture as determined to be a quick swipe, the scrolling is terminated at a distance equivalent to the corresponding indentation width. For example, a user device may receive two swipe gestures that result from contact with the touch screen for different amounts of time and/or a different horizontal distances. Despite these differences, the user device may determine that both swipe gestures correspond to contact with the touch screen for less than the threshold amount of time and/or less than the threshold horizontal distance. The user device interprets both swipe gestures to be quick swipes that may result in terminating the scrolling at a distance corresponding to an indentation width (or multiple thereof). As a result, each of the two quick swipes may result in the user device scrolling the TCUI by the same amount.

Referring to FIGS. 4A and 4C, the user device may receive a sustained swipe input gesture in a horizontal direction. As described above, a sustained swipe includes a gesture in which the input includes detectable contact with the touchscreen while moving in a horizontal direction for more than a threshold amount of time and/or more than a threshold horizontal distance. FIG. 4C illustrates TCUI 400 after the user device receives a sustained swipe. In one embodiment, in response to receiving a sustained swipe, the user device scrolls TCUI 400 and terminates the scrolling in a manner that positions a nested column at the left margin of the display area. For example, when the user device detects the touch input moving in a horizontal direction, the user device begins scrolling TCUI 400 in the direction corresponding to the movement. Upon detecting termination of the movement (e.g., the finger/stylus/etc. breaking contact with the touchscreen) and the distance and/or time of the movement is greater than a threshold amount of time and/or a threshold distance, the user device detects that a sustained swipe has been received. In response to the received sustained swipe, the user device selects a nested column that is nearest to the left margin of the display area or otherwise within a predetermined threshold proximity from the display area's left margin. When the selected column is not aligned with the left margin of the display area, the user device continues scrolling, either in the original scrolling direction or in the opposite direction, until the selected column is aligned with the left margin of the display area. For example, as illustrated in FIG. 4C, the user device positions the third nested column of TCUI 400 (including post 412) at the left margin of the display area of TCUI 400 in response to receiving the sustained swipe and after determining that the third nested column is the nested column that is nearest to the left margin or within a threshold proximity of the display area's left margin. As a further example, when the threshold proximity is half of indentation width 418 and the distance between the left edge of the third nested column and the left margin of the display area of TCUI 400 is half or less than half of indentation width 418 after the scrolling of the TCUI during a sustained swipe has been terminated, the user device positions the left edge of the third nested column at the left margin of the display area of TCUI 400. As a result of the terminating of the scrolling such that the third nested column is aligned with the left margin of the display area, one or more of the content items of the third nested column are fully displayed in TCUI 400. For example, post 412 of the third nested column, which was only partially displayed prior to the sustained swipe, is now fully displayed as a result of the sustained swipe, corresponding scrolling, and positioning of the third column at the left margin of the display area of TCUI 400.

In one embodiment, when the third nested column is not within the threshold proximity, the user device determines which of the other nested columns is within the threshold proximity and positions the other nested column at left margin of the display area. In one embodiment, when there is more than one nested column within the threshold proximity, the user device positions the nested column that is closest to the display area's left margin. In an embodiment, when two nested columns are equally proximate to the left margin, the user device terminates the scrolling by selecting one of the two nested columns. For example, a point of reference from one of the columns may lie on the left side of the left margin at the time the touch input ends and a point of reference from the other of the columns may lie on the right side of the left margin at the time the touch input ends. In response, the user device selects one of the two columns based upon direction of scrolling, the last column to be nearest the left margin during scrolling, which side of the left margin the columns lie, etc.

Figure 5A:
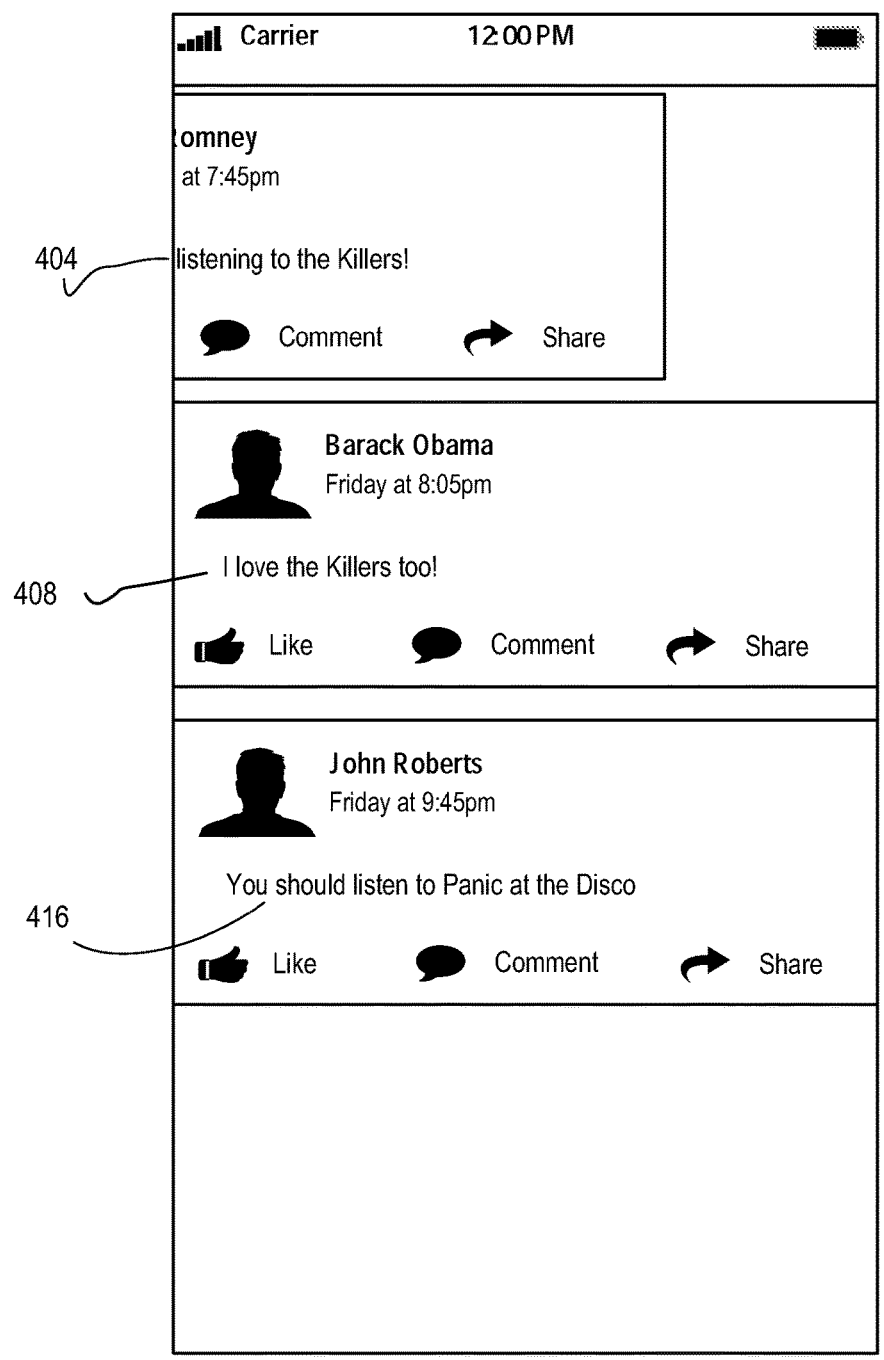
FIGS. 5A-5B illustrate, in an exemplary TCUI, a manner of presenting a threaded conversation when scrolling between a first view in which a column is at least partially outside of a display area and a second view in which the column is within the display area.
Figure 5B:
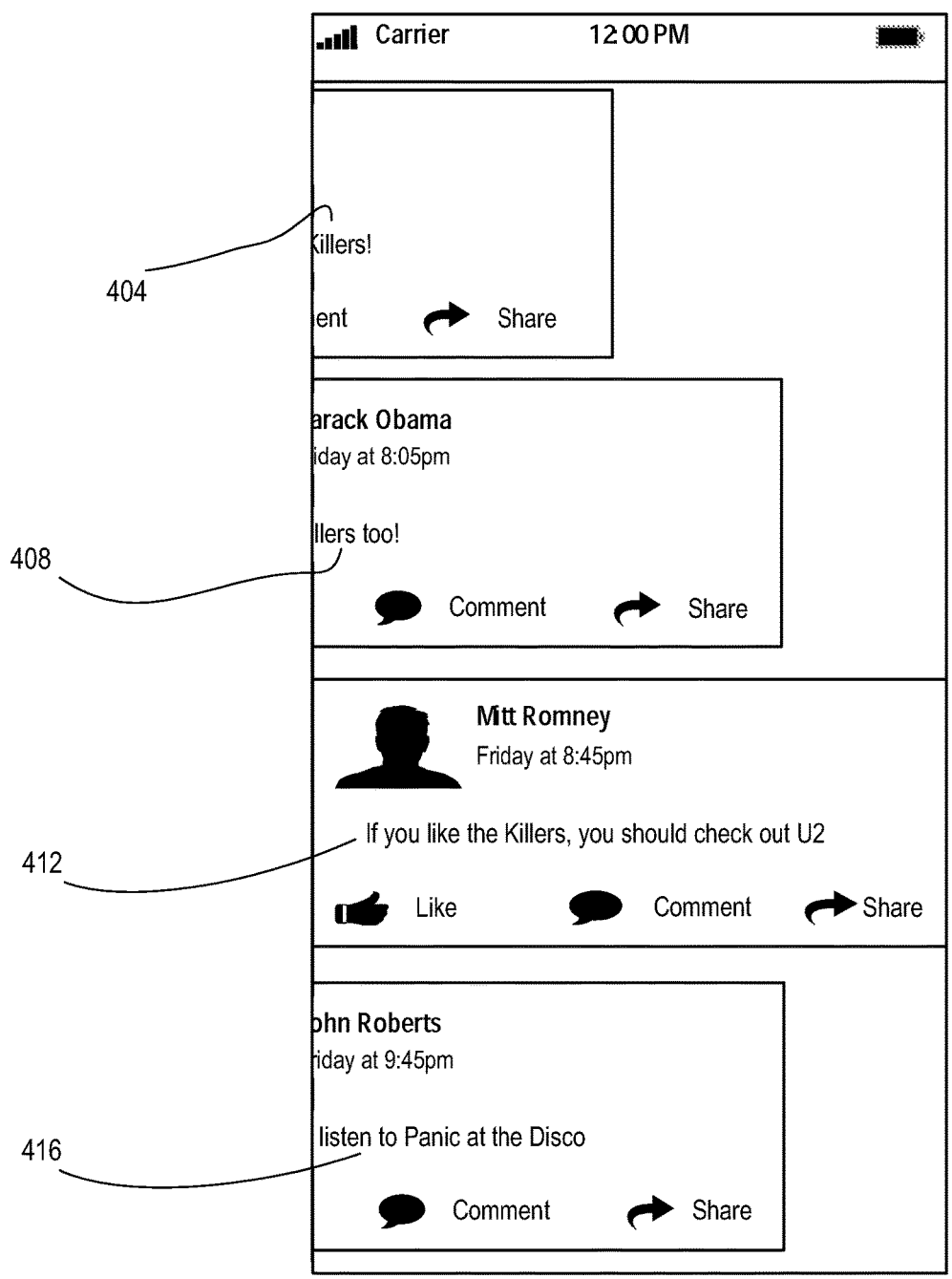

Referring now to FIGS. 5A-5B, which illustrate, in an exemplary TCUI 500, a manner of presenting a threaded conversation when scrolling between a first view in which a nested column is at least partially outside of a display area and a second view in which the column is within the display area. With regard to FIG. 5A, TCUI 500 omits (from being displayed) one or more content items (e.g., posts) when those content items are in nested columns that are at least partially outside of the display area. As illustrated, TCUI 500 is a modification of TCUI 400 as illustrated in FIG. 4B. For example, referring to FIG. 4B, the width of the third nested column is not fully within the display area of TCUI 400 and only a portion of post 412 within the third column is visible within TCUI 400. In contrast, TCUI 500 of FIG. 5A omits one or more of the content items within the third nested column (e.g., post 412) as a result of the width of the third column not being fully within the display area. In the illustrated example of FIG. 5A, the user device moves the post 416 upward in a vertical direction (e.g., relative to the position of post 416 in FIG. 4B) to utilize the vertical space within the display area that would have been consumed by omitted post 412.

In one embodiment, the user device positions the third column at the left margin of the display area of TCUI 500 and displays previously omitted post 412 in response to one of the input gestures described herein.

FIG. 5B illustrates TCUI 500 after the user device positions the third column at the left margin of the display area of TCUI 500, e.g., in response to at least one of the input gestures described herein or another method of scrolling TCUI 500. As a result of or in conjunction with the user device scrolling the third nested column to a position in which the entire width or a threshold portion of the width of the third nested column lies within the display area of TCUI 500, the user device displays one or more content items of the third nested column that were previously omitted (e.g., post 412). For example, the scrolling of TCUI 500 resulted in the entire or threshold amount of the width of the third column lying within the display area of TCUI 500 and, as a result, the user device moves post 416 downward in a vertical direction (relative to the position of post 416 in FIG. 5A) and inserts previously omitted post 412 in the vertical position between posts 408 and 416.

FIGS. 6A-6B illustrate, in an exemplary TCUI 600, a manner of presenting a threaded conversation in response to a selection of a visual placeholder (e.g., a touch input at a location corresponding to the displayed visual placeholder). With regard to FIG. 6A, TCUI 600 uses visual placeholders in lieu of omitting content that would otherwise only be partially displayed. As illustrated, TCUI 600 is a modification of TCUI 400 of FIG. 4B described above. For example, visual placeholders 602 and 610 are displayed in lieu of partially displaying posts 404 and 412.

In an embodiment, the user device scrolls TCUI 600 in response to receiving a selection of a visual placeholder 602 or 610. In this embodiment, the user device terminates the scrolling of the TCUI 600 when the left edge of the nested column containing the content that was replaced by the selected visual placeholder is positioned at the left margin of the display area.

FIG. 6B illustrates TCUI 600 following the user device receiving a selection of visual placeholder 602. For example, the user device positions the first nested column (including post 404) at the left margin of the display area of TCUI 600 in response to receiving a selection of placeholder 602 and displays the corresponding content item(s), including post 404, of the first nested column. As shown in FIG. 6B, the user device has not received a selection of visual placeholder 610 and visual placeholder 610 remains within the display area in lieu of content within the third nested column (e.g., post 412).

FIGS. 7A-7B illustrate, in an exemplary TCUI 700, a presentation of a threaded conversation in response to a selection of a column indicator 718. With regard to FIG. 7A, TCUI 700 is a modification of TCUI 400 of FIG. 4C described above. TCUI 700 includes column indicator 718. Column indicator 718 presents a number of nested columns located left of the left margin of the display area. For example, the third nested column is aligned with the left margin of the display area of TCUI 700 and column indicator 718 indicates two nested columns positioned left of the left margin of the display area.

In an embodiment, the TCUI 700 is scrolled in response to receiving a selection of column indicator 718. The user device terminates the scrolling when the left edge of the first nested column is positioned at the left margin of the display area. In one embodiment, the user device resets the column indicator 718 after the left edge of the first nested column is positioned at the left margin of the display area in response to the selection of the column indicator 718.

FIG. 7B illustrates TCUI 700 after the user device receives a selection of column indicator 718. As illustrated in FIG. 7B, the nested columns were scrolled to the right (with reference to FIG. 7A) in response to the selection of column indicator 718. For example, the user device positions the first nested column (including post 404) at the left margin of the display area in TCUI 700 in response to receiving the selection of column indicator 718. In one embodiment, the social networking system resets column indicator 718 to zero given that no nested columns are located left of the left margin of the display area in TCUI 700.

Figure 8:
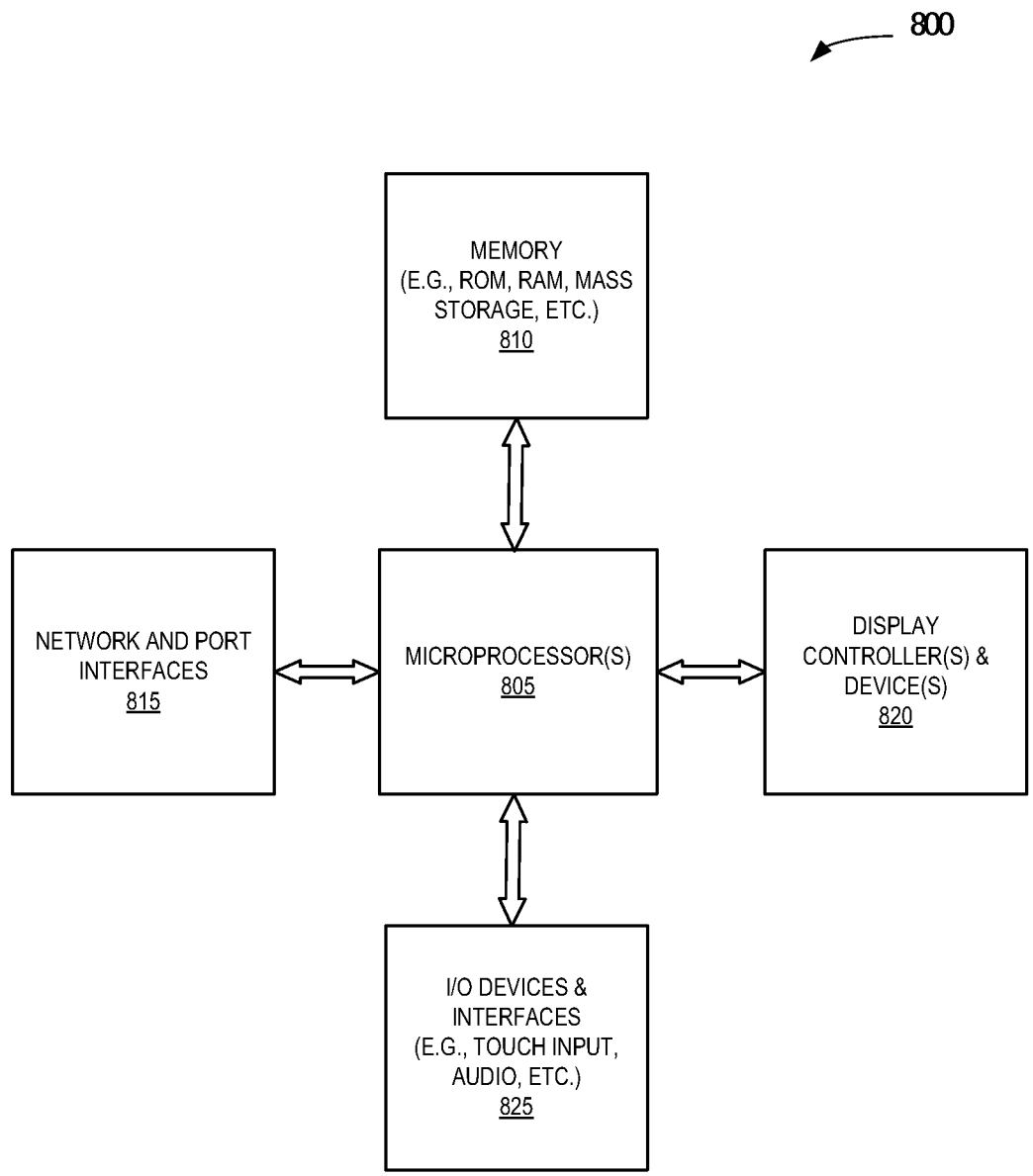
FIG. 8 illustrates, in block diagram form, an exemplary processing system to perform a process of presenting a TCUI and controlling the scrolling of the TCUI.

FIG. 8 illustrates, in block diagram form, exemplary processing system 800 to present a TCUI and control the scrolling of the TCUI as described herein. Data processing system 800 includes one or more microprocessors 805 and connected system components (e.g., multiple connected chips). Alternatively, data processing system 800 is a system on a chip.

Data processing system 800 includes memory 810, which is coupled to microprocessor(s) 805. Memory 810 may be used for storing data, metadata, and programs for execution by the microprocessor(s) 805. Memory 810 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 810 may be internal or distributed memory.

Data processing system 800 includes network and port interfaces 815, such as a port, connector for a dock, or a connector for a USB interface, FireWire, Thunderbolt, Ethernet, Fibre Channel, etc. to connect the system 800 with another device, external component, or a network. Exemplary network and port interfaces 815 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 800 with another device, external component, or a network and receive stored instructions, data, tokens, etc.

Data processing system 800 also includes display controller and electronic visual display 820 and one or more input or output ("I/O") devices and interfaces 825. Display controller and electronic visual display 820 provides a visual user interface for the user. I/O devices 825 allow a user to provide input to, receive output from, and otherwise transfer data to and from the system. I/O devices 825 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 8.

Data processing system 800 is an exemplary representation of one or more of the user device 104, external server 115, and one or more components of social networking system 130, or modules thereof (e.g., TCUI module 129), described above. Data processing system 800 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In one embodiment, data processing system 800 may be a network computer, server, or an embedded processing device within another device or consumer electronic product. As used herein, the terms computer, device, system, processing system, processing device, and "apparatus comprising a processing device" may be used interchangeably with data processing system 800 and include the above-listed exemplary embodiments.

Additional components, not shown, may also be part of data processing system 800, and, In one embodiment, fewer components than that shown in FIG. 8 may also be used in data processing system 800. It will be apparent from this description that aspects of the inventions may be embodied, at least in part, in software. That is, the computer-implemented method 300 and the processes described in FIGS. 4A-7B may be carried out in a computer system or other data processing system 800 in response to its processor or processing system 805 executing sequences of instructions contained in a memory, such as memory 810 or other non-transitory machine-readable storage medium. The software may further be transmitted or received over a network (not shown) via network interface device 815. In one embodiment, hardwired circuitry may be used in combination with the software instructions to implement the present embodiments. Thus, the techniques are not limited to any specific combination of hardware circuitry and software, or to any particular source for the instructions executed by data processing system 800.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:

providing a Threaded Conversation User Interface (TCUI) for display on a display area of a computer based on received configuration information for the display area of the computer, the TCUI comprising a plurality of nested columns, wherein a first comment is in a first nested column of the plurality of nested columns, a second comment is in a second nested column of the plurality of nested columns, and a third comment is in a third nested column of the plurality of nested columns, and wherein a left edge of the first nested column is positioned at a left margin of the display area, a left edge of the second nested column is indented a single indentation width in a horizontal direction from the left edge of the first nested column, the single indentation width being less than a width of the first nested column, and a left edge of the third nested column is indented multiple indentation widths in the horizontal direction from the left edge of the first nested column;

accessing an input gesture received via an input interface of the computer;

determining whether the input gesture is a quick swipe or a sustained swipe;

scrolling the TCUI in response to accessing the input gesture; and terminating the scrolling of the TCUI with the left edge of the second nested column positioned at the left margin of the display area, a right edge of the second nested column positioned at a right margin of the display area, and a right edge of the first nested column indented the single indentation width in a horizontal direction from the right edge of the second nested column, when the input gesture is determined to be the quick swipe; or terminating the scrolling of the TCUI with the left edge of the third nested column positioned at the left margin of the display area and a right edge of the third nested column positioned at the right margin of the display area, when the input gesture is determined to be the sustained swipe and when the left edge of the third nested column is within a threshold proximity from the left margin of the display area.

2. The computer-implemented method of claim 1, further comprising:

terminating the scrolling of the TCUI with a left edge of any other nested column that is within the threshold proximity from the left margin of the display area when the third nested column is not within the threshold proximity.

3. The computer-implemented method of claim 1, wherein, prior to the scrolling of the TCUI, the third comment is not displayed and a comment in at least one other nested column of the plurality of nested columns is displayed in a vertical position that would have been occupied by the third comment if the third comment were displayed, and wherein, as a result of the scrolling of the TCUI, the third comment is fully displayed in the vertical position and the other comment is moved downward in the TCUI.

4. The computer-implemented method of claim 1, wherein at least one of the second comment or the third comment is not displayed or only partially displayed prior to the scrolling of the TCUI and fully displayed after the scrolling of the TCUI terminates.

5. The computer-implemented method of claim 4, wherein a visual placeholder is displayed when a comment is partially displayed or not displayed.

6. The computer-implemented method of claim 5, further comprising:

accessing a selection of the visual placeholder;

in response to accessing the selection of the visual placeholder, scrolling the TCUI;

terminating the scrolling of the TCUI when a left edge of a nested column that was replaced by the visual placeholder is positioned at the left margin of the display area; and fully displaying the comment that corresponds to the nested column whose left edge is positioned at the left margin of the display area.

7. The computer-implemented method of claim 1, wherein the TCUI further comprises a column indicator to indicate a number of nested columns located left of the left margin.

8. The computer-implemented method of claim 7, further comprising:

accessing a selection of the column indicator;

in response to accessing the selection of the column indicator, scrolling the TCUI;

terminating the scrolling of the TCUI when the left edge of the first nested column is positioned at the left margin of the display area; and fully displaying a comment that corresponds to a nested column whose left edge is positioned at the left margin of the display area.

9. The computer-implemented method of claim 1, wherein the terminating the scrolling of the TCUI when the input gesture is determined to be the quick swipe is performed after the TCUI is scrolled the single indentation width.

10. A non-transitory computer-readable medium storing instructions which, when executed by one or more processors in a processing device, cause the processing device to perform steps comprising:

providing a Threaded Conversation User Interface (TCUI) for display on a display area of a computer based on received configuration information for the display area of the computer, the TCUI comprising a plurality of nested columns, wherein a first comment is in a first nested column of the plurality of nested columns, a second comment is in a second nested column of the plurality of nested columns, and a third comment is in a third nested column of the plurality of nested columns, and wherein a left edge of the first nested column is positioned at a left margin of the display area, a left edge of the second nested column is indented a single indentation width in a horizontal direction from the left edge of the first nested column, the single indentation width being less than a width of the first nested column, and a left edge of the third nested column is indented multiple indentation widths in the horizontal direction from the left edge of the first nested column;

accessing an input gesture received via an input interface of the computer;

determining whether the input gesture is a quick swipe or a sustained swipe;

scrolling the TCUI in response to accessing the input gesture; and terminating the scrolling of the TCUI with the left edge of the second nested column positioned at the left margin of the display area, a right edge of the second nested column positioned at a right margin of the display area, and a right edge of the first nested column indented the single indentation width in a horizontal direction from the right edge of the second nested column, when the input gesture is determined to be the quick swipe; or terminating the scrolling of the TCUI with the left edge of the third nested column positioned at the left margin of the display area and a right edge of the third nested column positioned at the right margin of the display area, when the input gesture is determined to be the sustained swipe and when the left edge of the third nested column is within a threshold proximity from the left margin of the display area.

11. The non-transitory computer-readable medium of claim 10, further comprising:

terminating the scrolling of the TCUI with a left edge of any other nested column that is within the threshold proximity from the left margin of the display area when the third nested column is not within the threshold proximity.

12. The non-transitory computer-readable medium of claim 10, wherein, prior to the scrolling of the TCUI, the third comment is not displayed and a comment in at least one other nested column of the plurality of nested columns is displayed in a vertical position that would have been occupied by the third comment if the third comment were displayed, and wherein, as a result of the scrolling of the TCUI, the third comment is fully displayed in the vertical position and the comment is moved downward in the TCUI.

13. The non-transitory computer-readable medium of claim 10, wherein at least one of the second comment or the third comment is not displayed or only partially displayed prior to the scrolling of the TCUI and fully displayed after the scrolling of the TCUI terminates.

14. The non-transitory computer-readable medium of claim 13, wherein a visual placeholder is displayed when a comment is partially displayed or not displayed.

15. The non-transitory computer-readable medium of claim 14, further comprising:

accessing a selection of the visual placeholder;

in response to accessing the selection of the visual placeholder, scrolling the TCUI;

terminating the scrolling of the TCUI when a left edge of a nested column that was replaced by the visual placeholder is positioned at the left margin of the display area; and fully displaying the comment that corresponds to the nested column whose left edge is positioned at the left margin of the display area.

16. The non-transitory computer-readable medium of claim 10, wherein the TCUI further comprises a column indicator to indicate a number of nested columns located left of the left margin.

17. The non-transitory computer-readable medium of claim 16, further comprising:

accessing a selection of the column indicator;

in response to accessing the selection of the column indicator, scrolling the TCUI;

terminating the scrolling of the TCUI when the left edge of the first nested column is positioned at the left margin of the display area; and fully displaying a comment that corresponds to a nested column whose left edge is positioned at the left margin of the display area.

18. The non-transitory computer-readable medium of claim 10, wherein the terminating the scrolling of the TCUI when the input gesture is determined to be the quick swipe is performed after the TCUI is scrolled the single indentation width.

19. An apparatus comprising:

a hardware processing device; and a hardware memory device coupled to the processing device, the memory device storing instructions which, when executed by the processing device, cause the apparatus to:

provide a Threaded Conversation User Interface (TCUI) for display on a display area of a computer based on received configuration information for the display area of the computer, the TCUI comprising a plurality of nested columns, wherein a first comment is in a first nested column of the plurality of nested columns, a second comment is in a second nested column of the plurality of nested columns, and a third comment is in a third nested column of the plurality of nested columns, and wherein a left edge of the first nested column is positioned at a left margin of the display area, a left edge of the second nested column is indented a single indentation width in a horizontal direction from the left edge of the first nested column, the single indentation width being less than a width of the first nested column, and a left edge of the third nested column is indented multiple indentation widths in the horizontal direction from the left edge of the first nested column;

access an input gesture received via an input interface of the computer;

determine whether the input gesture is a quick swipe or a sustained swipe;

scroll the TCUI in response to accessing the input gesture; and terminate the scrolling of the TCUI with the left edge of the second nested column positioned at the left margin of the display area, a right edge of the second nested column positioned at a right margin of the display area, and a right edge of the first nested column indented the single indentation width in a horizontal direction from the right edge of the second nested column, when the input gesture is determined to be the quick swipe; or terminate the scrolling of the TCUI with the left edge of the third nested column positioned at the left margin of the display area and a right edge of the third nested column positioned at the right margin of the display area, when the input gesture is determined to be the sustained swipe and when the left edge of the third nested column is within a threshold proximity from the left margin of the display area.

20. The apparatus of claim 19, wherein, prior to the scrolling of the TCUI, the third comment is not displayed and a comment in at least one other nested column of the plurality of nested columns is displayed in a vertical position that would have been occupied by the third comment if the third comment were displayed, and wherein, as a result of the scrolling of the TCUI, the third comment is fully displayed in the vertical position and the other comment n is moved downward in the TCUI.

* * * * *